A. R. FERGUSSON.
TIRE CONSTRUCTION.
APPLICATION FILED APR. 29, 1916.

1,255,000.

Patented Jan. 29, 1918.

UNITED STATES PATENT OFFICE.

ALAN R. FERGUSSON, OF CHICAGO, ILLINOIS.

TIRE CONSTRUCTION.

1,255,000.  Specification of Letters Patent.  Patented Jan. 29, 1918.

Application filed April 29, 1916. Serial No. 94,315.

*To all whom it may concern:*

Be it known that I, ALAN R. FERGUSSON, a citizen of the United States, residing at Chicago, in the county of Cook and State of Illinois, have invented a new and useful Tire Construction, of which the following is the specification.

This invention relates to rubber articles and particularly to the manufacture of sheets of united rubber and fabric and a combination of such sheets to form various articles of manufacture such as tires, or the like.

An object of the invention is to devise a method and means of uniting rubber into a multiple ply of combined rubber and fabric in such a way as to form practically homogeneous sheets which cannot be split apart or separated, and further to unite these sheets together by vulcanizing to build up a tire or other article, the vulcanizing in an article so manufactured being that of rubber to rubber instead of rubber to fabric, as is now sometimes necessary.

In making rubber tires for instance, the tread which generally consists of rubber is now customarily vulcanized to a fabric layer on the outside of the incomplete tire. This method is objectionable for the reason that it is impossible to make rubber satisfactorily adhere to fabric, inasmuch as the rubber will not unite with the fabric, but is simply forced into more or less intimate contact with the same. A tire thus constructed, when subjected to a heavy blow from a stone or the like will cleave at the junction of the rubber and the fabric forming what is known as a blister which soon becomes perforated; fills with sand, water, etc., and causes the rotting of the tire and is otherwise unsightly and objectionable. A tire made according to my invention has none of these disadvantages.

Figure 1:
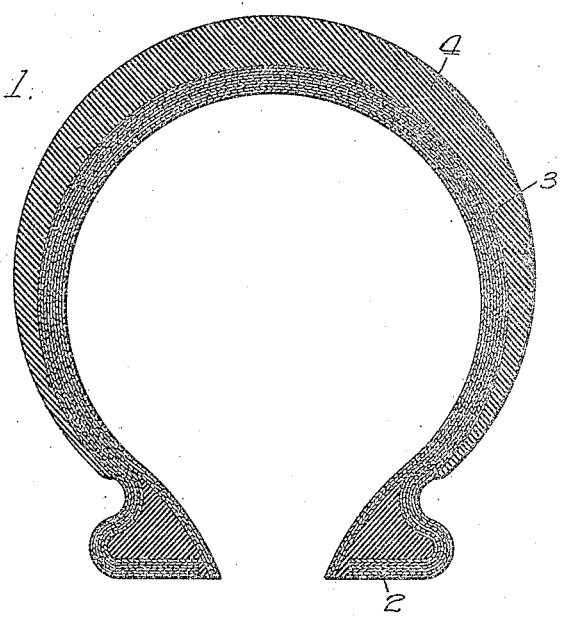
Figure 1 is a cross-sectional view of a tire made according to my invention.
Figure 2:
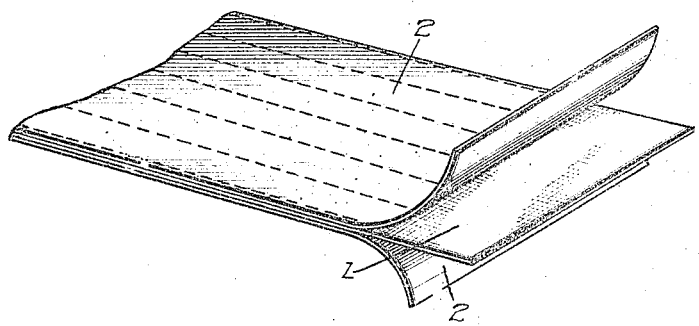
Fig. 2 is a perspective view of a sheet of combined rubber and fabric made according to my invention.
Figure 3:
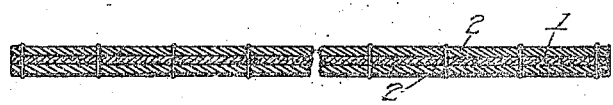
Fig. 3 is a cross-sectional view of said sheet.

1 represents a layer of fabric upon each side of which is laid a layer 2 of rubber, the rubber being very thoroughly stitched through the fabric, as indicated, so that the stitchings pass over the rubber on both sides of the fabric and through the fabric. When the sheet according to Fig. 2 has been made and sewn, it is vulcanized, the vulcanizing process causing the rubber to follow the threads employed in stitching through the fabric so that to all intents and purposes the two sheets of rubber are united and become integral one with the other, and adhere together as closely for all practical purposes as they would were no layer of fabric interposed between them.

In making a tire, I build up the inner portion 3 thereof from a plurality of such sheets vulcanized together, it being particularly noted that the vulcanizing process acts to vulcanize rubber to rubber each time thus making a homogeneous uniform connection, having no junction therein susceptible to cleavage.

The rubber tread 4 is next vulcanized upon a tire, it being again noted that the vulcanization is of rubber to rubber so that the rubber tread becomes as firmly united to the body of the tire as it would be were the two made of one piece of rubber. Inasmuch as in a tire so constructed there is no junction of rubber to canvas between the tread and body of the tire, bruises will not cause a cleavage of the tread away from the body of the tire and blisters cannot be formed. A tire so constructed has all the uniformity and adhesive strength of solid rubber, besides having the advantage in cheapness and general strength of a tire reinforced and strengthened by layers of canvas.

Of course I do not wish to limit myself to successive vulcanization of the respective layers of the tire and the tread, it being sometimes practicable to perform the entire vulcanizing operation at once, whereby the layers of the tire and the tread will all be vulcanized in one operation and together.

Having now described my invention, I claim:

1. A tire comprising a body portion having a composite sheet therein consisting of a layer of rubber both vulcanized and stitched to a layer of fabric, and a second layer of rubber vulcanized to said first layer, rubber to rubber throughout its area, whereby the second layer will be firmly attached to the first layer and the danger of blistering between the layers to a large extent eliminated.

2. A tire consisting of a plurality of superposed separate composite sheets, each separate sheet being made up of a layer of fabric having a layer of rubber stitched and vulcanized on each side thereof, the said stitching being confined to each sheet separately, said sheets being vulcanized together rubber to rubber, and a covering portion and comparatively thick tread vulcanized to the outermost said layer so as to be attached thereto rubber to rubber.

3. A tire consisting of a body portion, having a composite sheet therein consisting of a layer of fabric with a layer of rubber stitched and vulcanized upon each side thereof, the stitching being confined to said composite sheet, and a tread portion of rubber vulcanized to one of said sheets of rubber throughout its area, whereby the tread will be firmly attached to the tire, substantially as described.

In witness whereof, I hereunto subscribe my name to this specification in the presence of two witnesses.

ALAN R. FERGUSSON.

Witnesses:
SEBASTIAN AUSTON,
I. V. CURRAN.